(12) United States Patent
Ma et al.

(10) Patent No.: US 7,991,867 B2
(45) Date of Patent: Aug. 2, 2011

(54) SERVER CHECKING USING HEALTH PROBE CHAINING

(75) Inventors: Kevin Ma, Nashua, NH (US); Brenda Thompson, Hollis, NH (US)

(73) Assignee: Cisco Technology, Inc., San Jose, CA (US)

( * ) Notice: Subject to any disclaimer, the term of this patent is extended or adjusted under 35 U.S.C. 154(b) by 703 days.

(21) Appl. No.: 11/486,202

(22) Filed: Jul. 13, 2006

(65) Prior Publication Data

US 2008/0016206 A1    Jan. 17, 2008

(51) Int. Cl.
*G06F 15/173* (2006.01)
*G06F 13/00* (2006.01)

(52) U.S. Cl. ................. 709/223; 709/224; 710/104
(58) Field of Classification Search ............ 709/223, 709/224; 710/104
See application file for complete search history.

(56) References Cited

U.S. PATENT DOCUMENTS

| | | | | |
|---|---|---|---|---|
| 7,216,164 | B1 * | 5/2007 | Whitmore et al. | 709/224 |
| 7,233,989 | B2 * | 6/2007 | Srivastava et al. | 709/224 |
| 7,254,626 | B1 * | 8/2007 | Kommula et al. | 709/223 |
| 7,287,075 | B2 * | 10/2007 | Srivastava et al. | 709/224 |
| 7,478,151 | B1 * | 1/2009 | Maiocco et al. | 709/223 |
| 7,496,651 | B1 * | 2/2009 | Joshi | 709/223 |
| 2001/0049732 | A1 * | 12/2001 | Raciborski et al. | 709/224 |
| 2003/0225880 | A1 * | 12/2003 | Srivastava et al. | 709/224 |
| 2005/0289265 | A1 * | 12/2005 | Illowsky et al. | 710/104 |
| 2006/0259607 | A1 * | 11/2006 | O'Neal et al. | 709/223 |
| 2007/0143454 | A1 * | 6/2007 | Ma et al. | 709/222 |

OTHER PUBLICATIONS

Cisco CSS11000 and CSS 115000 Series Content Services Switches with Cisco WebNS Software, Scripted Keepalive Guidelines; Cisco Systems, Inc. 3 pages; http://www.cisco.com/en/US/products/hw/contnetw/ps792/prod_bulletin09186a008017bb55.html.
Keepalive Configuration Mode Commands; Cisco Content Services Switch Command Reference, Chapter 2, pp. 2-542 thru 2-556; http://www.cisco.com/en/US/products/hw/contnetw/ps792/products_command_reference_chapter09186a0080573fe2.html.
Configuring Health Monitoring; Catalyst 6500 Series Content Switching Module Installation and Configuration Note, Chapter 9, pp. 9-1 thru 9-10; http://www.cisco.com/en/US/products/hw/switches/ps708/module_installation_and_configuration_guides_chapter09186a008022ff41.html.
Configuring Keepalives; Cisco Global Site Selector Global Server Load-Balancing Configuration Guide, Chapter 5, pp. 5-1 thru 5-32; http://www.cisco.com/en/US/products/hw/contnetw/ps4162/products_configuration_guide_chapter09186a008032d0aa.html.
Token Ring; IEEE 802.5; 2 pages, http://www.cisco.com/univercd/cc/td/doc/cisintwk/ito_doc/tokenrng.htm#xtocid5.
IP Option 9, Strict Source Route; 2 pages, http://www.networksorcery.com/enp/protocol/ip/option009.htm.

* cited by examiner

*Primary Examiner* — Firmin Backer
*Assistant Examiner* — Michael A Chambers
(74) *Attorney, Agent, or Firm* — Fish & Richardson P.C.

(57) ABSTRACT

A load balancer sends a probe packet to a first server in a list of servers. Each server in the list sends the probe successively down the list of servers and acknowledges the probe if the server is healthy. The final server in the list sends a signal to the load balancer to indicate that the chain of server probing has completed successfully. In this manner, the load balancer (or other device performing the checking) only needs to send a single probe rather than probe each server in the list separately. Embodiments include serial and recursive acknowledgments from the servers, sending a beacon message upon failure, and other features.

20 Claims, 5 Drawing Sheets

SERVER CHECKING USING HEALTH PROBE CHAINING

BACKGROUND OF THE INVENTION

This invention relates in general to digital networks and more specifically to checking server status by using health probe chaining.

Collections of computers are used for many different applications such as in business, education, entertainment, and for recreational and other uses. These collections can include hundreds, thousands or more, separate computers or other digital processing devices. One type of popular arrangement includes many server computers referred to as a "server farm" for providing World Wide Web ("web") services over the Internet. Such web services can include serving web pages, processing transactions, performing database searches, etc.

In order to ensure that a large collection of servers is operating properly it is important to detect when a server computer becomes inoperable or otherwise malfunctions. This can be accomplished by intermittently checking the status of each server. One detection approach uses "keepalive" signals or "health probes." These signals can be various types of communications such as messages that are sent by a central device, such as a load balancer, to each server in the collection. When a server receives the health probe it responds to the load balancer so that the load balancer can assume that the responding server is operating properly. However, one drawback of this approach is that health probing can be a resource intensive task depending on the number of servers to check and the frequency of sending the health probes and processing the returned data.

DETAILED DESCRIPTION OF EMBODIMENTS OF THE INVENTION

Figure 1:
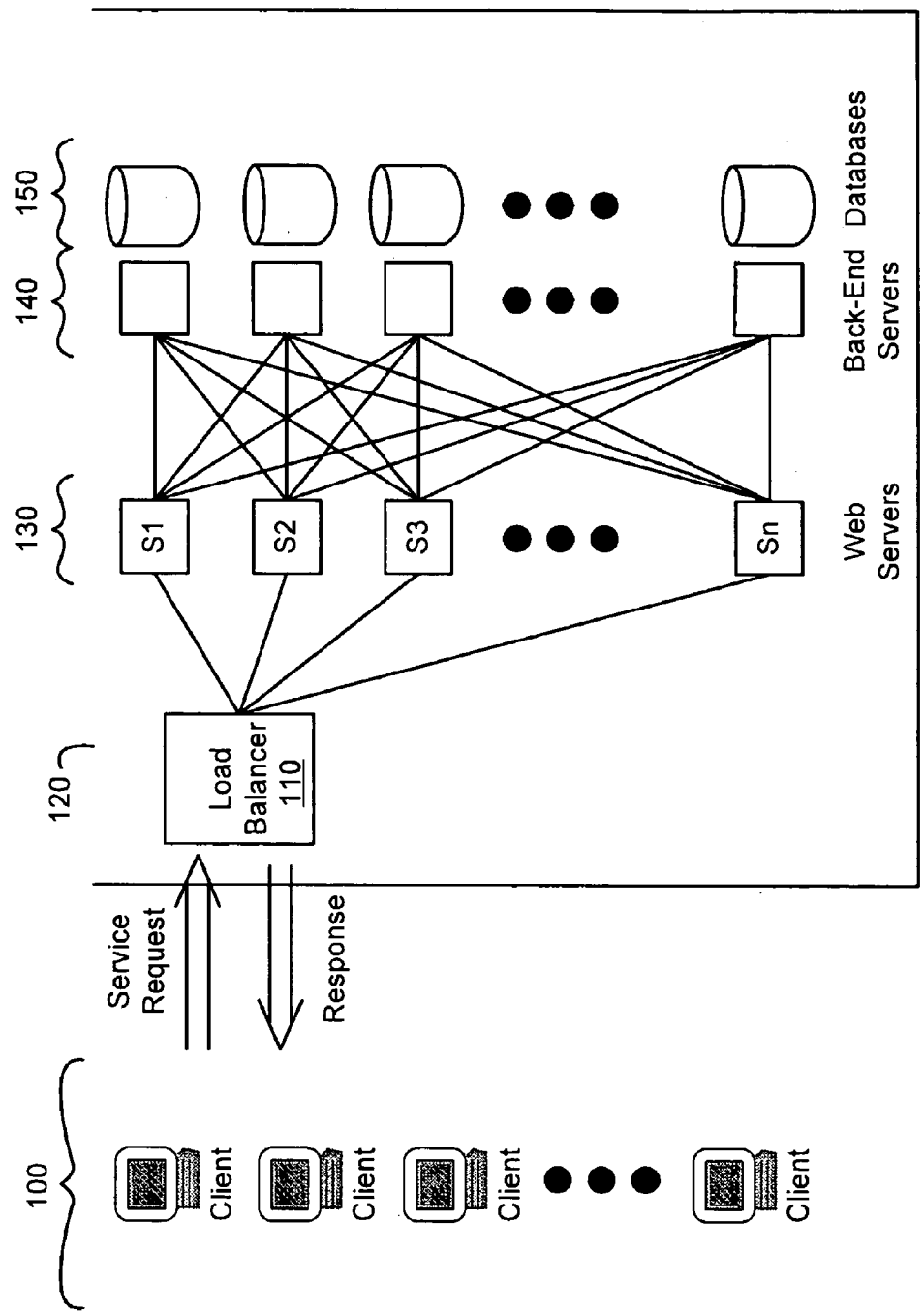
FIG. 1 shows a load balancer in a server farm system suitable for use with the present invention.

In a preferred embodiment, a load balancer sends a probe packet to a first server in a group of servers. The probe packet includes a list of servers to probe and an index counter. The head and tail of the list (i.e., the first and last entries, respectively) list the IP address of the load balancer. The probe is sent to the first server in the list (the second entry) with an index of one. The first server verifies that it is the correct first server, executes the probe function and sends an acknowledgement (ACK) back to the load balancer, increments the index, and sends the probe packet to the second server in the list.

The second server verifies that it is the correct second server, executes the probe function and sends an ACK to the first server, increments the index, and sends the probe packet to the third server in the list. The third server verifies that it is the correct third server, executes the probe function and sends an ACK to the second server, increments the index and sends the probe packet to the fourth server in the list. Each subsequent server repeats the behavior so that if the probe packet makes it all the way through the chain then the last server in the chain sends the probe packet back to the load balancer as the last hop in the chain.

In this manner, the load balancer only needs to send a single packet to perform health probing of the multiple servers in the chain. The load balancer only needs to receive two signals, (i.e., packets or flames) in order to determine that all servers in the chain are operational. These two signals are the first server's ACK and the last server's forwarded probe. In this case, the resources used to probe multiple servers can be significantly reduced from the traditional approach of querying each server with a separate health probe from the load balancer.

In the case of a failure, a "beacon" message is sent from the last known good server to the load balancer when the last good server fails to receive an ACK from the failed server as determined, for example, by a timeout period. Other types of failure detection can be used such as the failed or failing server sending an error message or diagnostic information, assuming the failing server or other associated device or circuitry is able to do so. The beacon message identifies the failed server to the load balancer. The failed server can then be removed from the chain and a new health probe is sent using a modified list that does not include the failed server.

A network administrator can be notified of the failed server (e.g. via Syslog or Simple Network Management Protocol (SNMP) Trap, etc.) and a single discrete server probe (i.e., not a chained probe) can be automatically configured to probe the failed server to monitor the failed server's status and detect when or if the failed server comes back online. Other steps can be taken to attempt to fix or reboot the failed server. If the failed server does come back online then it can be added back into service and added back to the original chain, or it can be included in a different chain.

A single server farm or load balancer can use a single chain or multiple chains. For example, different chains may be used depending upon the frequency of checking of different groups of servers. If one group needs to be checked more frequently than another group then the two groups can be on two different chains with the load balancer sending out the health probes for the two chains at the different designated intervals. Chains can be prioritized or categorized according to the type of server or device being checked, the traffic level of devices, etc. Chains may also be divided up by probe type (e.g. Internet Control Message Protocol (ICMP), HTTP, HTTPS, FTP, SNMP, Telnet, etc), such that probes of a similar type, to multiple servers, may be grouped into a chain. The assignment of a server to a chain can vary according to a human operator's selection or according to other factors such as utilization or loading of a server or server type. Assignments of servers to chains can vary dynamically or in real time according to any suitable factors.

Table I shows an example, of a frame format for the health probe.

TABLE I

Total Number of Addresses
Current Index
Flags
(G)SLB Interface IP Address
IP Address of First Server to Probe
IP Address of Second Server to Probe
. . .
IP Address of Last Server to Probe
(G)SLB Interface IP Address
Checksum In Table I, the "Total Number of Addresses" field indicates the number of IP addresses included in the list. In the format of Table I, the total number of IP addresses is equal to the number of servers to probe plus 2 occurrences of the load balancer IP address. The total number of IP addresses is used to ensure that the chaining does not exceed the number of servers in the list. This might happen, for example, if a server's processing of the probes is faulty. If the index value ever exceeds the total number of addresses then a device that detects this condition can send a beacon to the load balancer, halt the probe processing, or take other action.

The Current Index is used by a server receiving the frame to verify its own IP address in the list, to determine the IP address of the next device (index +1) to which to send the frame or probe, and to determine the IP address of the previous device (index −1). The receiving server processes the probe and sends an ACK to the IP address at the index −1, increments the index, looks up the next IP address corresponding to the incremented index in the list, and then forwards the frame to the next IP address. The (Global) Server Load Balancer (G)SLB IP address is included as the first and last list entries so that the (G)SLB receives the ACK from the first server and also receives the frame from the last server. Note that other ways to identify servers or devices may be used. For example, a MAC address, MPLS label, etc., can be used.

Note that the format of Table I is only an illustration of a basic format. This format can be changed for different implementations. For example, an alternative format need not use an index. A receiving server can look up its IP address in the list, send an ACK to the server that precedes it and send the frame to the server that follows it in the list. Also, the frame and list format need not be used at all in different embodiments so long as a mechanism is provided to achieve chaining. The chaining feature can be implemented as a servlet, common gateway interface (CGI) script, etc. The feature can be implemented using existing protocols or standards, in whole or in part.

FIG. 1 shows a server farm 120, including load balancer 110 for distributing service requests from clients 100 to servers S1-SN. Examples of load balancers are the Cisco Content Services Switch (CSS) Series 11500 models and the Cisco Content Services Module (CSM). However, the initiation and/or processing of a health probe chain can be performed any suitable device that acts as a controller or monitor, or that is in communication with multiple servers or other devices to be checked. For example, a network appliance, network orchestration or management device, etc. can be used to initiate, control and interpret the results of a chained health probe. A server or device being checked could also be used to initiate and process the chained health probes, as desired.

Web servers 130 are typically provided with additional resources such as back-end servers 140, databases 150 and other resources that are not shown. In general, any number, arrangement and type of servers and server resources can be used. Not all servers need be checked by a chained approach. For example, some servers may be the subject of chained health probes while others are probed one-on-one by a load balancer or controller.

Two types of chained health probing are possible based on when ACKs are sent. These are sequential and recursive chaining.

Figure 2:
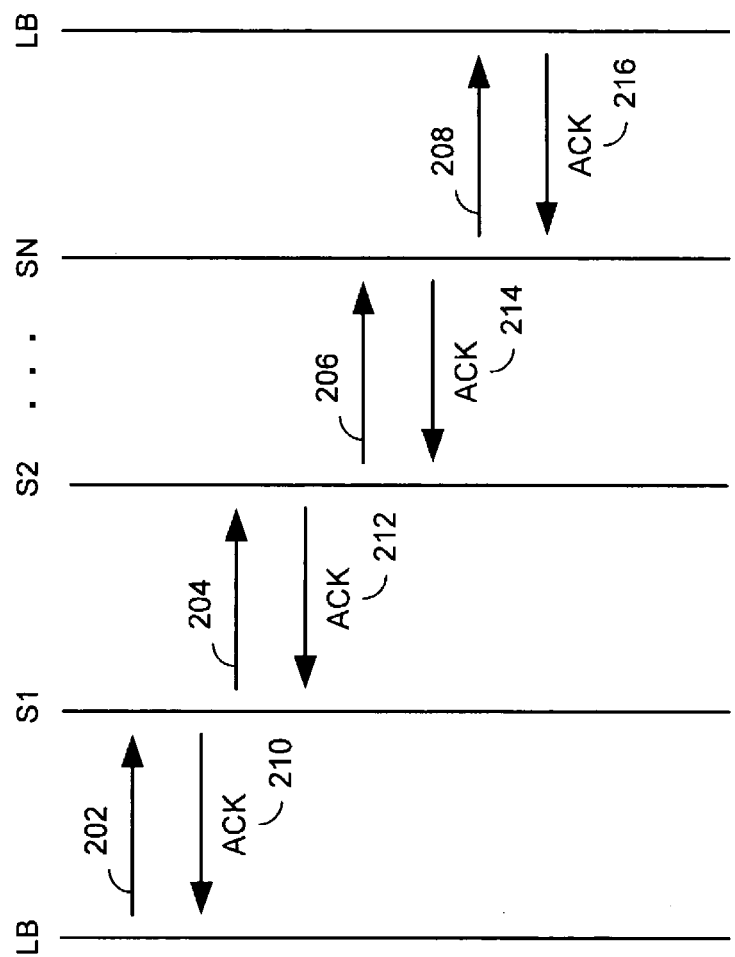
FIG. 2 shows a timing diagram for sequential form of chaining.

FIG. 2 shows a timing diagram for sequential chaining. In FIG. 2, load balancer LB first sends health probe frame 202 to server S1. Server S1 responds with ACK 210 in response to the frame. Server S1 then sends the health probe frame to S2 which responds with ACK 212. Sending of the health probe frame and receiving of an ACK is performed by successive servers until server SN receives frame 206 and responds with ACK 214. Server SN is the final server in the list so server SN sends health probe frame 208 back to LB. LB responds to SN with ACK 216. Note that the health probe frames that are sent need not be identical. Information can be added to, removed from or modified from the original health probe frame. For example, it may not be necessary to include the complete list in each subsequent health probe frame. Any information that is derived from the initial health probe frame, or list, may be included in the subsequent frames.

In the sequential example of FIG. 2, the ACK is sent to the previous server before a probe is sent to the next server. The sequential approach provides a fast ACK to each sending server (or the LB for the initial probe). The timeout period of a server waiting for an ACK can be relatively short and the time for the LB to receive the final frame can be essentially just the accumulated forward-sending times of the probes. Probes can be forwarded immediately, even prior to or concurrently with sending an ACK. In the sequential case, if a timeout is detected (i.e., failure to receive an ACK within a predetermined time period) then the server detecting the timeout sends a beacon message directly to the LB to indicate the failure. The failed server can be removed from the list and the probe of the chain can be restarted. The LB should be prepared to receive and handle multiple beacon messages.

Figure 3:
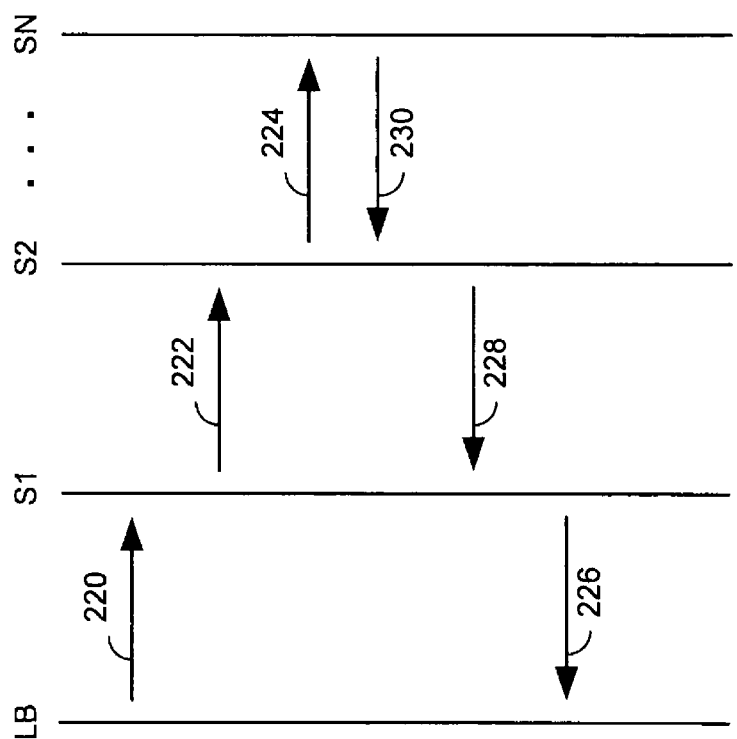
FIG. 3 shows a timing diagram for a recursive form of chaining.

FIG. 3 shows a timing diagram for recursive chaining. In FIG. 3, each health probe frame is sent immediately when received. An ACK is not sent from a current server to the prior server unless an ACK has been received from a subsequent server or unless the current server is the last server in the list. As shown in FIG. 3, LB sends probe 220 to S1, S1 sends probe 222 to S2 and so on until server SN receives probe 224. SN then responds with ACK 230 to the prior server, S2, which then responds to S1 with ACK 228. S1 then sends ACK 226 to LB. The receipt of an ACK from S1 to LB indicates to LB that all of the servers in the chain are operational (i.e., "alive").

With the recursive approach no processing of a final probe from SN to LB is required. This could mean that the recursive approach can integrate more easily with existing messaging or probing mechanisms already in use by servers. Thus, deployment of recursive chaining may require less changes to existing probe infrastructure. However, the latency for ACKs from servers, particularly for servers that appear earlier in the list, can be greatly increased depending upon the total number of servers in the chain. Such long latency times may cause problems such as false timeouts. As with the sequential approach, when a server detects a timeout then a beacon message is sent directly to the LB so that the failed server can be removed from the list and the chained health probe will be re-attempted.

Figure 4:
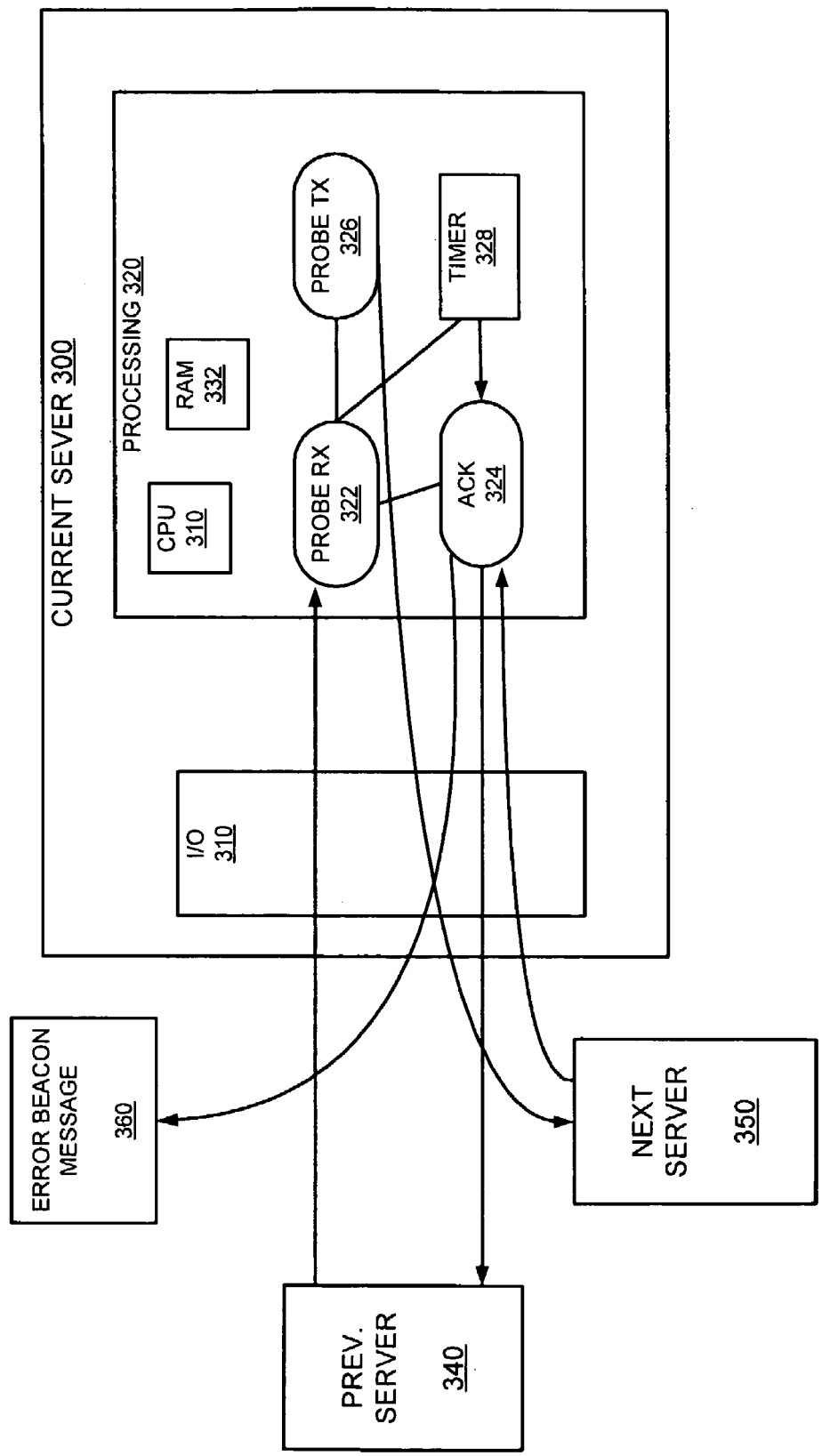
FIG. 4 shows basic processing hardware suitable for performing functions of the invention.

FIG. 4 illustrates basic processing hardware and software that may be included in a server computer or other device for performing health probe chaining according to embodiments of the invention.

In FIG. 4, current server 300 includes hardware such as input/output (I/O) subsystem 310 and processing resources 320. Processing resources 320 include central processing unit (i.e., processor) 330, random access memory (RAM) 332 and timer 328. Any number and type of processing resources or other components or subsystems can be included in the server. Functionality is also provided by software, firmware, or other programmed instructions as represented by probe receiving process 322, probe transmitting process 326, and acknowledgement process 324. Different selections and arrangements of components and processes can be used.

A health probe message is received by current server 300 from previous server 340. The health probe message includes a list of servers that includes previous server 340, current server 300 and next server 350. The list of servers is processed by processing resources 320 to receive the health probe message and list, at probe receiving process 322. The processor would typically store the list in RAM at least temporarily to detect its position in the list as the current server and identify the previous and next servers. Probe transmitting process 326 transfers the list in a replication of the health probe message to next server 350. Note that if the current server is the last server in the list then the next server is the load balancer or other controller device that originated the health probe.

In a recursive acknowledgement mode, acknowledgement process 324 sends an ACK back to previous server 340 if an ACK is received back from next server 350 before timer 328 expires. If a sequential mode is used, the ACK is sent at or near the time when the health probe message is received by probe receiving process 322 in the current server. In either mode, if timer 328 expires before an ACK is received from the next server then an error beacon message 360 is sent to the load balancer or other controller device that originated the health probe message.

Figure 5:
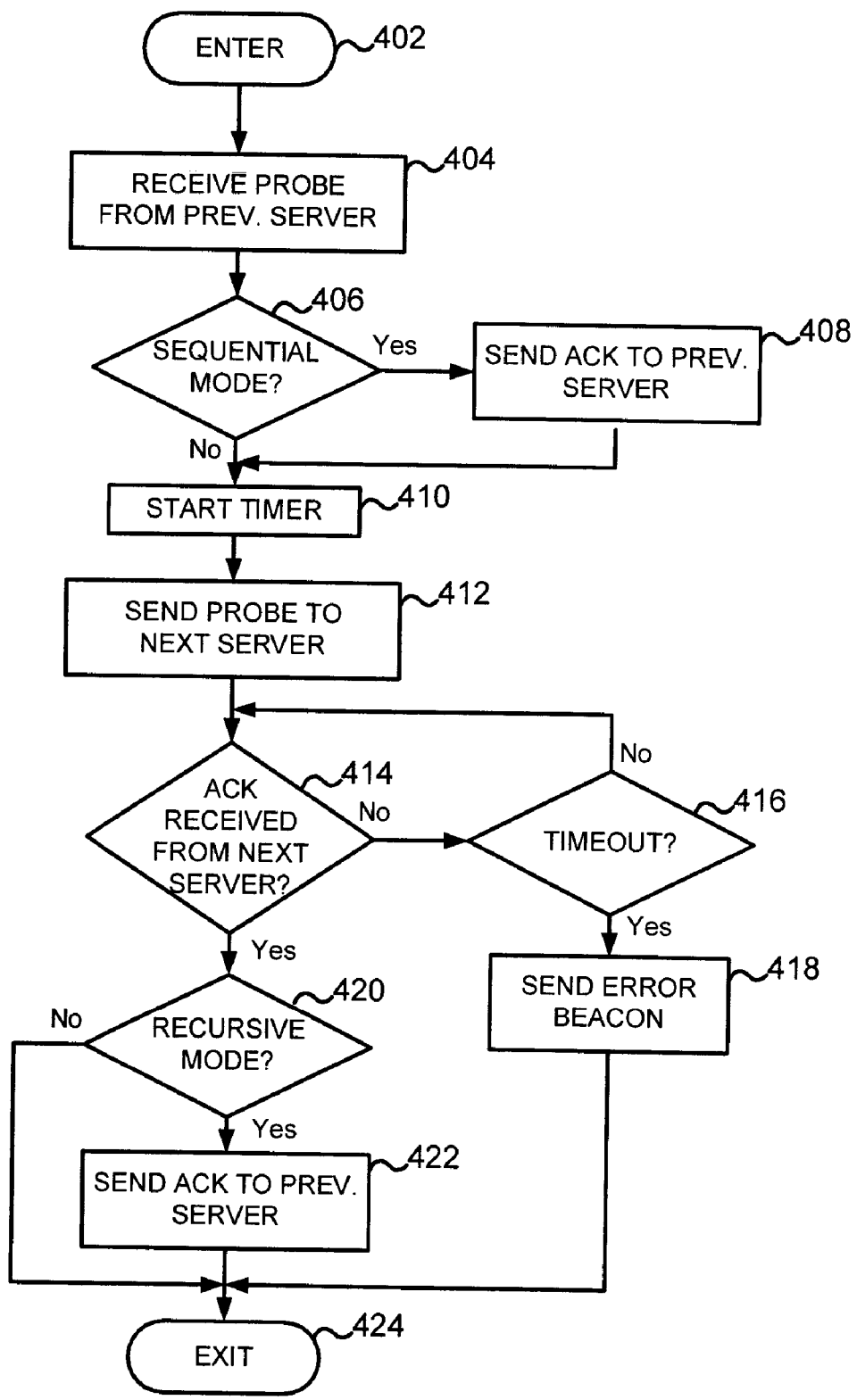
FIG. 5 is a flowchart illustrating basic steps in an embodiment of the invention.

FIG. 5 illustrates a flowchart that shows the basic steps in a routine to process a chained health probe message in a server or other processing device being checked. Steps can be omitted from, modified or added to those shown in FIG. 5. In general, the order of processing steps can vary and may not be critical to the operation of the invention unless otherwise noted.

The routine of FIG. 5 is entered at 402 when a health probe message is received. At step 404 the health probe message is process to obtain the list of servers in the message. The current server is identified in the list and the previous and next servers are identified along with the device (e.g., load balancer) that originated the health probe.

At step 406 a check is made to test whether the chaining is sequential or recursive. Note that other modes may be used. Servers can be pre-programmed to operate in a specific mode, or the mode designation can be included in the health probe message itself. If the mode is sequential then step 408 is executed to send an ACK to the previous server. If the mode is not sequential then step 408 is skipped and an ACK is not sent to the previous server at this time.

Step 410 is executed to start a countdown timer (e.g., timer 328 of FIG. 4) and step 412 is executed to send the health probe message to the next server in the list. Next, a check is made at step 414 to test whether an ACK has been received. If not, step 416 checks for a timer timeout. The loop of 414 and 416 continues until there is either a timer timeout or ACK received from the next server. Implementation of this loop, or any other sequence or group of instructions or functions can be by polling, interrupt, parallel processing or other suitable methods.

Assuming that an ACK is received from the next server before a timeout, then the timer can be stopped or its timeout signal can be masked or disabled. Step 420 is then performed to test whether a recursive mode of health probe chaining is being used. If so, an ACK is sent to the previous server and the routine is exited at 424. Otherwise, the routine is exited at 424 without sending an ACK.

If a timeout occurs at step 416 then step 418 is executed to send an error beacon message to the originating device to report a timeout and failure of the next server and the routine is exited at step 424.

Although embodiments of the invention have been discussed primarily with respect to specific arrangements, formats, protocols, etc. any other suitable design or approach can be used. For example, multiple health probe chains can be in the process of being checked at any one time. Two different devices can be used at opposite ends of a chain so that the chain is "open" rather than "closed." In such a case the end device might expect a probe at a specific time. The probe would be originated by a beginning device, passed through the chain, and ultimately be received by the end device within a predetermined time window. Other variations are possible.

The embodiments described herein are merely illustrative, and not restrictive, of the invention. For example, the network may include components such as routers, switches, servers and other components that are common in such networks. Further, these components may comprise software algorithms that implement connectivity functions between the network device and other devices. Features of the invention can be adapted for other applications than are explicitly described herein. For example, features can be used for probing router health, or path health (e.g. MPLS Label Switched Paths (LSPs)), in large Service Provider (SP) networks.

Any suitable programming language can be used to implement the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain and store the program for use by or in connection with the instruction execution system, apparatus, system or device. The memory can be, by way of example only but not by limitation, a semiconductor system, apparatus, system, device, or computer memory.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc.

Portions of processing can be performed at different times and at different locations, by different (or the same) processing systems.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be by, for example, wired, wireless, electromagnetic, optical or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An apparatus comprising:
    one or more processors; and
    a machine-readable storage medium including instructions executable by the one or more processors for:
        accessing an operational criterion used to select a sever;
        identifying, based on the operational criterion, a plurality of servers, such that each server in the plurality of servers meets the operational criterion at a time the server was last contacted;
        obtaining an IP (Internet Protocol) address of each server in the plurality of servers;
        constructing a probe packet in which the IP address of the each server in the plurality of servers is listed in an order, a first and a last IP addresses in a list being IP addresses of the apparatus and including, in the probe packet, instructions on processing the probe packet by a server that receives the probe packet;
        instructing, through a transmission of the probe packet, each server in the list receiving the probe packet to process the instructions included in the probe packet and to send the probe packet to a next server in the list;
        sending the probe packet to a first server whose IP address is a second IP address in the list of IP addresses in the probe packet, the first server performing an operation based on the instructions included in the probe packet and sending the probe packet to a subsequent server whose IP address is a next address in the list of IP addresses, such that the probe packet is passed through each server whose IP address is in the list of IP addresses, with each server sending an acknowledgement signal to the server it received the probe packet from, and a last server to receive the probe packet sends the probe packet to the apparatus;
        receiving the acknowledgement signal from the first server and the probe packet from the last server; and
        determining, based on at least one selected from a group including receiving the acknowledgement signal from the first server and receiving the probe packet from the last server, that all of the servers in the list meet the operational criterion.

2. The apparatus of claim 1, wherein the operational criterion includes a condition that all the servers in the list are operational.

3. The apparatus of claim 1, wherein the signal includes a frame sent from a server corresponding to a final address in the list of addresses.

4. The apparatus of claim 1, wherein the machine-readable medium further comprises one or more instructions for receiving a beacon signal from a server in the list, wherein the beacon signal indicates that a server in the list has failed the operational criterion.

5. The apparatus of claim 4, wherein the machine-readable medium further comprises one or more instructions for informing a human administrator that a server in the list has failed the operational criterion.

6. The apparatus of claim 5, wherein the machine-readable medium further comprises one or more instructions for:
removing the failed server from the list to create a modified list; and
resending the list to determine that all of the servers in the modified list meet the operational criterion.

7. The apparatus of claim 6, wherein the machine-readable medium further comprises one or more instructions for sending a health probe signal to the failed server, wherein the sending a health probe signal is performed subsequent to receiving the beacon signal.

8. The apparatus of claim 6, wherein the machine-readable medium further comprises one or more instructions for initiating a procedure to remove the failed server from further use.

9. A method comprising:
accessing an operational criterion used to select a sever;
identifying, based on the operational criterion, a plurality of servers, such that each server in the plurality of servers meets the operational criterion at the time the each server was last contacted;
obtaining an IP (Internet Protocol) address of each server in the plurality of servers;
constructing a probe packet in which the IP address of the each server in the plurality of servers is listed in an order, a first and a last IP addresses in a list being IP addresses of the apparatus and including, in the probe packet, instructions on processing the probe packet by a server that receives the probe packet;
instructing, through a transmission of the probe packet, each server in the list receiving the probe packet to process the instructions included in the probe packet and to send the probe packet to a next server in the list;
sending the probe packet to a first server whose IP address is a second IP address in the list of IP addresses in the probe packet, the first server performing an operation based on the instructions included in the probe packet and sending the probe packet to a subsequent server whose IP address is a next address in the list of IP addresses, such that the probe packet is passed through each server whose IP address is in the list of IP addresses, with each server sending an acknowledgement signal to the server it received the probe packet from, and a last server to receive the probe packet sends the probe packet to the apparatus;
receiving the acknowledgement signal from the first server and the probe packet from the last server; and
determining, based on at least one selected from a group including receiving the acknowledgement signal from the first server and receiving the probe packet from the last server, that all of the servers in the list meet the operational criterion.

10. The method of claim 9, wherein the operational criterion includes a condition that all the servers in the list are operational.

11. The method of claim 9, wherein the signal includes a frame sent from a server corresponding to a final address in the list of addresses.

12. The method of claim 9, further comprising receiving a beacon signal from a server in the list, wherein the beacon signal indicates that a server in the list has failed the operational criterion.

13. An apparatus comprising:
means for sending a probe packet to a first server whose IP (Internet Protocol) address is a second IP address in a list of IP addresses in the probe packet, the first server performing an operation based on instructions included in the probe packet and sending the probe packet to a subsequent server whose IP address is a next address in the list of IP addresses, such that the probe packet is passed through each server whose IP address is in the list of IP addresses, with each server sending an acknowledgement signal to the server it received the probe packet from, and a last server to receive the probe packet sends the probe packet to the apparatus;
means for receiving the acknowledgement signal from the first server and the probe packet from the last server; and
means for determining, based on at least one selected from a group including receiving the acknowledgement signal from the first server and receiving the probe packet from the last server, that all of the servers in the list meet an operational criterion.

14. A server device comprising:
one or more processors; and
a machine-readable storage medium including instructions executable by the one or more processors for:
receiving a probe packet from an external device, wherein the received health probe packet includes a list of server Internet Protocol (IP) addresses associated with two or more server devices, wherein a current address included in the list is associated with the server device, the server device belonging to the two or more server devices;
determining a health status of the server device and performing an operation based on instructions included in the probe packet; and
sending, in response to the determining a health status and based on the instructions included in the probe packet, the probe packet to a subsequent server whose IP address is a next address in the list of IP addresses, such that the probe packet is passed through each server whose IP address is in the list of IP addresses, with each server sending an acknowledgement signal to the server it received the probe packet from, wherein a last server to receive the probe packet sends the probe packet to the external device, and wherein such that the external device determines, based on at least one selected from a group including receiving the acknowledgement signal from a first server and receiving the probe packet from the last server, that all of the servers in the list meet an operational criterion.

15. The server device of claim 14, wherein determining a health status includes determining that the server device is operational.

16. The server device of claim 14, wherein the machine-readable medium further includes instructions for:
determining an error condition with a health status of the server device; and
sending a beacon message in response to the determining an error condition.

17. A method comprising:
receiving a probe packet from an external device, wherein the received probe packet includes a list of server Internet Protocol (IP) addresses associated with two or more server devices, wherein a current address included in the list is associated with the server device, the server device belonging to the two or more server devices;

determining a health status of the server device and performing an operation based on instructions included in the probe packet; and sending, in response to the determining a health status and based on the instructions included in the probe packet, the probe packet to a subsequent server whose IP address is a next address in the list of IP addresses, such that the probe packet is passed through each server whose IP address is in the list of IP addresses, with each server sending an acknowledgement signal to the server it received the probe packet from, wherein a last server to receive the probe packet sends the probe packet to the external device, such that the external device determines, based on at least one selected from a group including receiving the acknowledgement signal from a first server and receiving the probe packet from the last server, that all of the servers in the list meet an operational criterion.

18. The method of claim 17, wherein determining a health status includes determining that the server device is operational.

19. The method of claim 17, further comprising:

determining an error condition with a health status of the server device; and sending a beacon message in response to the determining an error condition.

20. An apparatus comprising:

means for receiving a probe packet from an external device, wherein the received probe packet includes a list of server Internet Protocol (IP) addresses associated with two or more server devices, wherein a current address included in the list is associated with the server device, the server device belonging to the two or more server devices;

means for determining a health status of the server device and performing an operation based on instructions included in the probe packet; and means for sending, in response to the determining a health status and based on the instructions included in the probe packet, the probe packet to a subsequent server whose IP address is a next address in the list of IP addresses, such that the probe packet is passed through each server whose IP address is in the list of IP addresses, with each server sending an acknowledgement signal to the server it received the probe packet from, wherein a last server to receive the probe packet sends the probe packet to the external device, such that the external device determines, based on at least one selected from a group including receiving the acknowledgement signal from a first server and receiving the probe packet from the last server, that all of the servers in the list meet an operational criterion.

* * * * *